Sept. 7, 1937.  J. HALTENBERGER  2,092,506
WHEEL COVER
Filed April 28, 1937  2 Sheets-Sheet 1
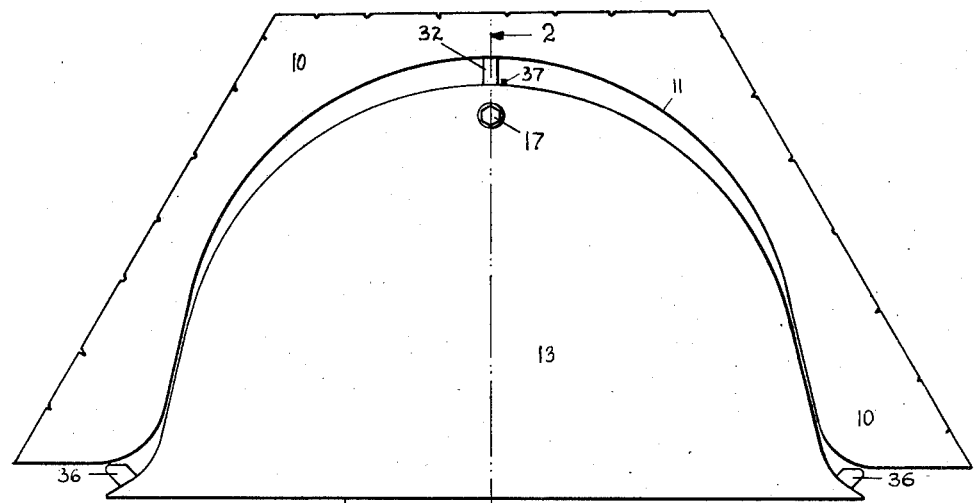
Fig. 1
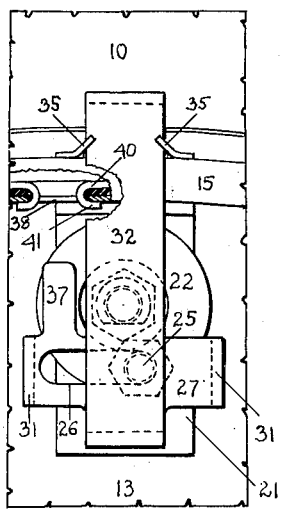
Fig. 4
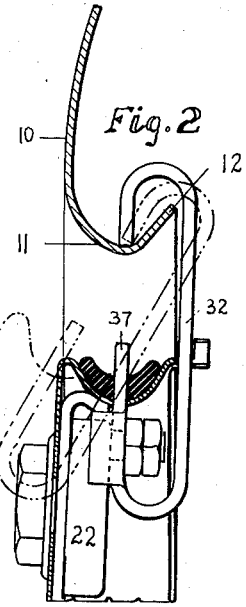
Fig. 2
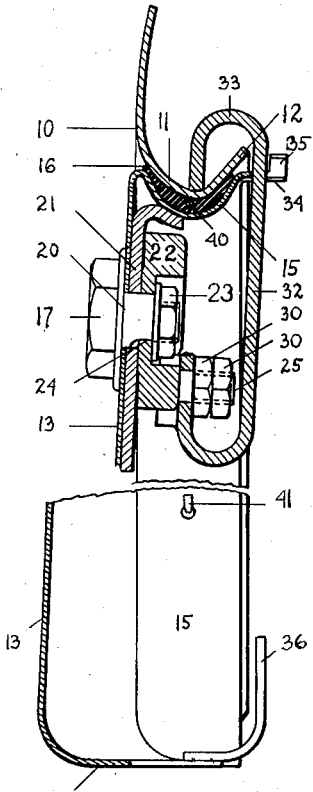
Fig. 3  INVENTOR.
Jules Haltenberger

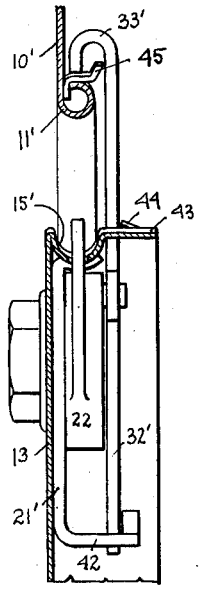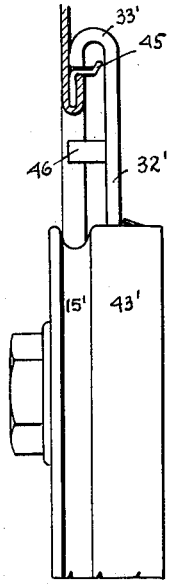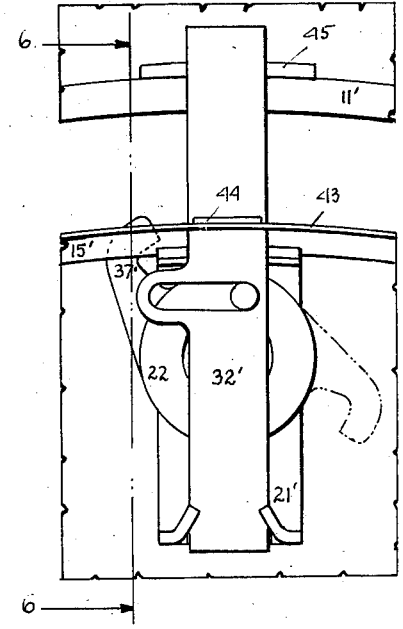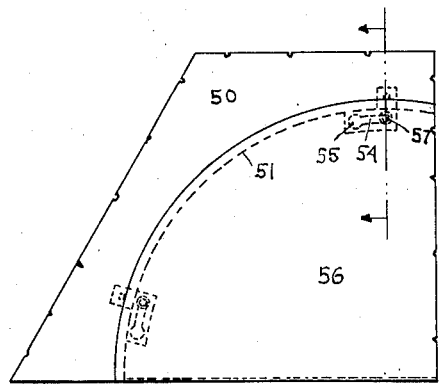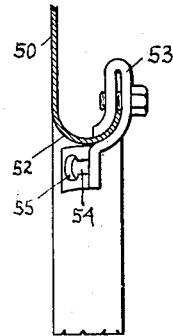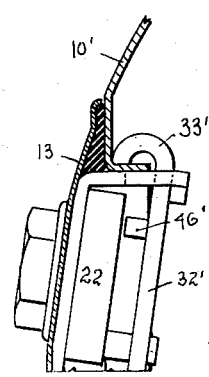

Patented Sept. 7, 1937

2,092,506

UNITED STATES PATENT OFFICE 2,092,506

WHEEL COVER

Jules Haltenberger, Indianapolis, Ind.

Application April 28, 1937, Serial No. 139,548

8 Claims. (Cl. 280—153)

My invention relates to wheel covers.

Various types of wheel covers were proposed for closing the wheel exposing opening of a depending outside wall of a fender or body in a vehicle as proposed in applicant's U. S. Patent No. 2,048,862. Some of the proposed covers however necessitate the alteration of the depending wall or the usual in-turned edge that defines such opening; these alterations encompass the drilling or punching of holes or necessitate the bolting on various brackets. Types of covers were proposed where the mounting of the cover entails the tightening of various bolts and nuts or the cover has to be held by one hand and tightening of bolts or locks must be done with the other.

It is here proposed to mount a wheel cover in a depending wall while without the alteration of the depending wall or in-turned edge construction and in two progressive operations; first hooking the cover in the opening, second locking it in place by a single quick acting operation.

A further object of my invention is to separate the contacting surfaces between the depending wall or in-turned edges and the cover by the unlocking operation, to facilitate removal of the cover in case the usual rubber sealer is sticking or is even partially vulcanized between such surfaces by sun exposure.

A further object is to provide a simple "hooked on" wheel cover construction.

Further objects of my invention will appear as the description proceeds.

My invention might be incorporated in constructions illustrated in the accompanying drawings:

Fig. 1 is a side elevation of an outer wall of a vehicle body with a hooked on wheel cover in place while in unlocked position; Fig. 2 is a transverse section substantially on lines 2—2 of Fig. 1; Fig. 3 illustrates the wheel cover in locked in position substantially on lines 2—2 of Fig. 1; Fig. 4 is a side elevation of the lock illustrated in Fig. 3; Fig. 5 is a modification of the invention illustrated in Fig. 4; Fig. 6 is a transverse section substantially on lines 6—6 of Fig. 5; Fig. 7 is a modification of the invention illustrated in Fig. 6; Fig. 8 is a modification of the cover construction; Fig. 9 is a further modification of the invention; Fig. 10 is a transverse section substantially on lines 10—10 of Fig. 9.

Referring to the construction illustrated in Figs. 1, 2, 3 and 4 it will be seen that a depending wall 10 of a body or fender is provided with a downwardly open tapered wheel exposing opening defined by an in-turned edge 11 and terminating in a flange 12, thereby forming a channel.

A wheel cover having a bulged outer wall 13 is formed with a periphery of similar character as the wheel exposing opening and is dimensioned to overlap the wheel exposing opening. The bottom of wall 13 is provided with an in-turned flange 14 and the periphery of wall 13 is formed into a channel 15 substantially to mate with the in-turned edge 11 while providing for a rubber sealer 16 (to be described) between the two mating channels, thereby laterally and vertically positioning the cover in the depending wall when in locked position.

Wall 13 at its upper end is provided with an operating bolt head 17 preferably the same size as the usual wheel nuts to permit the use of the usual wheel wrench that every automobile is provided with. The bolt head as by a shank 20 is arranged to pass through the wall 13 and reinforcing plate 21 and is rigidly connected to disc 22 as by nut 23 and driving key flattening 24 while permitting the free turning of the bolt head and to it jointed disc respectively.

The inner face of disc 22 is provided with an excentrically positioned stud 25 arranged to freely slide in a groove 26 of a plate 27. Plate 27 is held in free operative relation to the face of disc 22 by a pair of locked nuts 30. The lateral edges of plate 27 are turned over to form flanges 31. The space between these flanges is slightly larger than the outside diameter of disc 22 to form a substantially vertical guide for plate 27 when disc 22 is turned.

A bottom extension of plate 27 is turned into a U shape and the upward continuation is formed into a reach 32 and terminating in a hook 33. Reach 32 is guided by an opening that is slightly larger than the reach in a short flange 34 integral with channel 15. For inexpensive assembly the end of flange 34 is provided with two lips 35. In the original die punching these lips are protruding vertically. After the reach is in its place these lips are bent inwardly to guide the reach.

By positioning the inner end of groove 26 slightly beyond the dead center position of stud 25, the groove will act as a double limiter for the turning of operating bolt head 17.

As is clear from Figs. 1 and 2 in open position of the lock, hook 33 is passed over flange 12 (as indicated by the chain line). When the cover is released by its own weight it will take the position shown in these figures, assuming however that the operator hooked on the cover in the center of the opening. To help the operator to position the hook in the center of the opening (with centrally located hook on the cover) as is clear from Fig. 1, I provide at each bottom corner of the cover a pair of aligners 36 (also shown in Fig. 3 in larger scale). The extreme ends of these aligners are arranged to pass with a small clearance the in-turned edges of the wheel exposing opening. These aligners cooperate to permit the cover to take a central position when passing the rounded in-turned edges.

When the cover is in positions illustrated in Figs. 1 and 2, by turning the bolt head 17 with a wheel wrench slightly over half a turn, thereby passing the bottom dead center, the cover will be locked in place as shown in Figs. 3 and 4.

When it is desired that the unlocking of the cover should also separate the cover from the opening, this is also illustrated in Figs. 1, 2, 3 and 4. As is clear from these drawings, plate 27 is provided with a separator 37 arranged to pass through an opening 38 in the bottom of channel 15 and it is dimensioned to protrude beyond the outer periphery of wall 13 when the lock is turned to the limit of the "released" position. The reach 32 and parts integral therewith ascend vertically in the first half of the unlocking operation; with a separator however in the second half of the operation, when the upper end of separator 37 touches the opposing part of the in-turned edge 11 the continued operation will push the cover downwardly, forcibly separating the cover from its seat.

It is desirable to interpose between the cover and wheel exposing opening an anti-squeak and sealing material; rubber 16 is found to be the best. It is desirable to secure the rubber strip to the inside of the cover channel; for this purpose I mount on the rubber a wire 40 and through suitable openings in the channel 15 I pass the ends of the wire and form there a sharp bend 41 as indicated in Figs. 3 and 4. This method is inexpensive and valuable when forcible separation of the cover and seat is used.

The above described construction does not necessitate a change in the wheel exposing opening construction, especially in two of the largest quantity manufactured automobiles. The wheel cover can be used as an accessory without any compulsion whatsoever as the opening is not disfigured. The mounting is a simple operation: first the simple hooking on process, second the release of the cover, and last the operator when provided with the usual wheel wrench turns the single lock bolt less than one turn.

The removal consists of turning the lock reverse to the mounting operation, causing unlocking and separation, and the operator simply unhooks the cover. Either of the operations can be performed in a short time, diminishing the dangers of crowded automobile roads.

Figs. 5 and 6 illustrate a modification of the invention.

Here the disc 22 is provided with a separator 37' arranged to protrude through an opening in channel 15'. When the cover is in the locked position separator 37' is indicated by the chain lines. As this separator describes an arc, to arrange the needed clearance for its path, reach 32' is guided in an extension 42 of reinforcing plate 21'. The upper guide of reach 32' is in the inward flange 43 of the cover. In one direction it is controlled by lip 44, here shown in a bent down position. This lip before assembling, however, protrudes vertically (not shown) and exposes an opening of sufficient width to permit the insertion of reach 32'. As is also clear from Figs. 5 and 6 the wheel exposing opening in wall 10' is defined by a substantially circular in-turned edge 11'. This form of edge is usually an incompleted circle and in the usual gap I insert a ledge 45 to form a channel for the hook 33'.

Fig. 7 illustrates a modification of the invention. Here a separator 46 in shape of a stud laterally protrudes from the reach 32'. The channel 15' and inward flange 43' at their upper ends are provided with a suitable opening (not shown) to permit the separator 46 to pass through when the locking mechanism is operated.

The advantages of the hooked on construction are not limited to a cover with an outwardly open channel construction. It is also useful with a purely overlapping cover construction; this is illustrated in Fig. 8.

The purely overlapping cover construction is not new with the applicant and the ones he is acquainted with are inserted by an upward movement and are held while the locking operation takes place.

Figs. 1 to 8 inclusive illustrate cover constructions where the cover is hooked on on an approximately 30° angle. For certain applications when it is desired to hook on a cover with substantially a horizontal translation, this is illustrated in Figs. 9 and 10. Here a depending wall 50 is provided with a wheel exposing opening 51 defined by an in-turned edge 52; to it is clamped brackets 53 provided with a curved slot 54, terminating at one end in hole 55. As is clear from Fig. 10 the lower part of the bracket 53 is on a slight engaging angle to the plane of wall 50. Wheel cover 56 is provided with a nail shaped engaging pin 57; the engaging pin head is smaller than hole 55 and the body or neck of the pin is smaller than the slot 54. As is clear from Fig. 9 more than one of these engaging units are mounted on edge 52; preferably not less than three (two shown) to permit the wheel cover 56 to be placed on wall 50 by a horizontal movement to insert pins 57 into holes 55. The cover is then locked by a turning movement that at the periphery of the wheel cover 56 substantially corresponds to the length of curved slot 54. The angle of the lower part of bracket 53 is metered to press the wheel cover 56—its overlapping periphery at least—against wall 50 when the cover is turned to the right, as viewed in Fig. 9, and to separate such surfaces when turned to the left.

The term "fender" in the claims is intended to refer to a fender per se or a body construction which forms in effect the fender or a wheel house provided with a wheel exposing opening.

What I claim as my invention:

1. A shield for disposition on a fender having means thereon to engage a latch, said shield including a substantially plane portion, an inturned portion, and a latching means, said inturned portion being located substantially at the periphery of said plane portion and being provided with a slot therein, said latch including a leg portion comprising means to engage said fender latch engaging means and a second means adapted to operate through said slot to engage said fender, whereby said shield is held engaged with said fender by said engaging means or assisted from operative position by said second means during removal of the shield from said fender.

2. The invention described in claim 1 wherein the bottom of the plane portion of said shield is provided with a pair of laterally disposed aligners.

3. A shield for disposition on a fender having means thereon to engage a latch, said shield including a substantially plane portion, an inturned portion, and a latching means, said inturned portion being located substantially at the periphery of said plane portion and being provided with a slot therein, said latch including a leg portion comprising means to engage said fender latch engaging means and a second means integral with said leg portion adapted to operate through said slot to engage said fender, whereby said shield is held engaged with said fender by said engaging means or assisted from operative position by said second means during removal of the shield from said fender.

4. The invention described in claim 3 where the inturned portion of the shield is formed in shape of a flange.

5. A shield for disposition on a fender having means thereon to engage a latch, said shield including a substantially plane portion, an inturned portion, and a latching means, crank operating means for said latching means, said inturned portion being located substantially at the periphery of said plane portion and being provided with a slot therein, said latch including a leg portion comprising means to engage said fender latch engaging means and a second means integral with said crank operating means adapted to operate through said slot to engage said fender, whereby said shield is held engaged with said fender by said engaging means or assisted from operative position by said second means during removal of the shield from said fender.

6. The invention described in claim 5 where the inturned portion of the shield is formed in shape of a flange.

7. A shield for disposition on a fender having means thereon to engage a latch, said shield including a substantially plane portion, an inturned portion, and a latching means, said inturned portion being located substantially at the periphery of said plane portion, said latch including a leg portion comprising means to engage said fender latch engaging means and a second means adapted to operate in abutting relation to said fender, whereby said shield is held engaged with said fender by said engaging means or assisted from operative position by said second means during removal of the shield from said fender.

8. The invention described in claim 7 where the bottom of the plane portion of said shield is provided with a pair of laterally disposed aligners.

JULES HALTENBERGER.